No. 652,691. Patented June 26, 1900.
W. P. QUENTELL.
TYPE WRITING MACHINE.
(Application filed Apr. 20, 1899.)
(No Model.)

WITNESSES:
E. Wolff
Chas. E. Beusger

INVENTOR
William P. Quentell.
BY
Hauff & Hauff
ATTORNEYS

THE NORRIS PETERS CO., PHOTO-LITHO., WASHINGTON, D. C.

UNITED STATES PATENT OFFICE.

WILLIAM P. QUENTELL, OF HARRISBURG, PENNSYLVANIA, ASSIGNOR TO THE KEYSTONE TYPEWRITER COMPANY, OF NEW YORK, N. Y.

TYPE-WRITING MACHINE.

SPECIFICATION forming part of Letters Patent No. 652,691, dated June 26, 1900.

Application filed April 20, 1899. Serial No. 713,772. (No model.)

*To all whom it may concern:*

Be it known that I, WILLIAM P. QUENTELL, a citizen of the United States, residing at Harrisburg, in the county of Dauphin and State of Pennsylvania, have invented new and useful Improvements in Type-Writing Machines, of which the following is a specification.

By means of this invention type wheels or segments can be made readily and accurately interchangeable and wear can be taken up, so that the wheel or segment is kept true or in position for proper work, as set forth in the following specification and claim and illustrated in the annexed drawings, in which—

Figure 1:
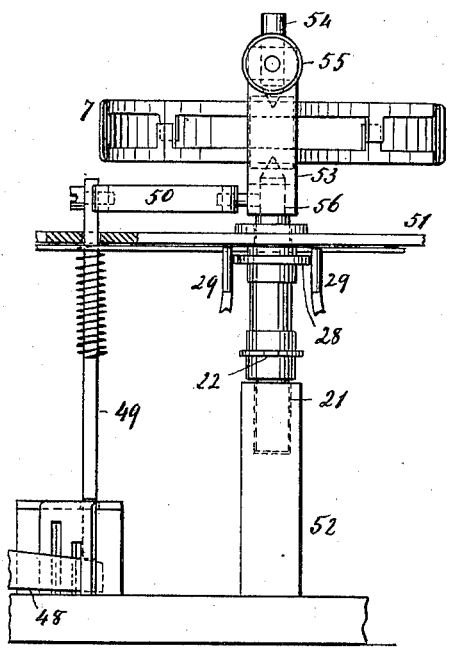
Figure 2:
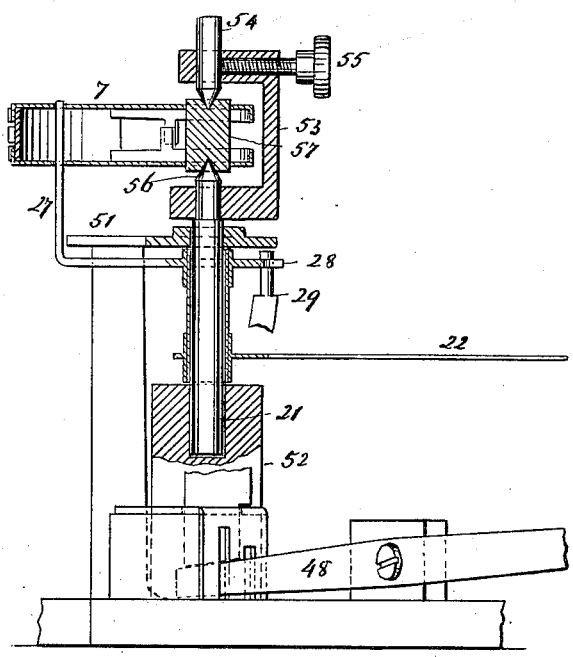
Figure 3:
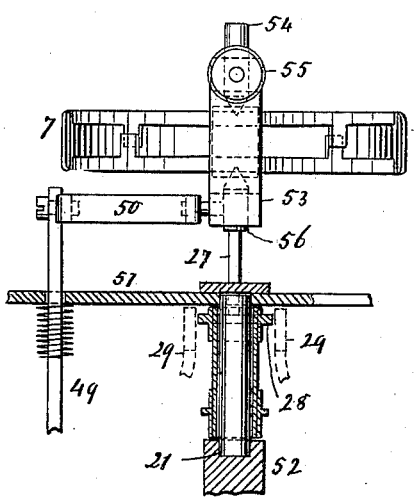
Figure 4:
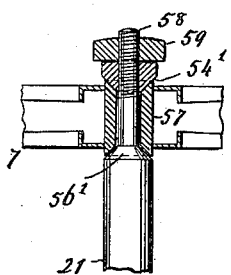
Figure 5:
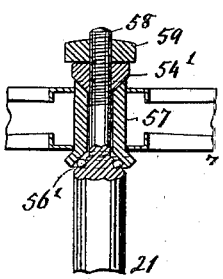

Figure 1 is a front elevation of part of a type-writing machine with a wheel. Fig. 2 is a sectional side elevation of Fig. 1. Fig. 3 shows a modification. Fig. 4 shows another modification. Fig. 5 shows a further modification.

The type wheel or segment 7 is rotated by arm 27. The wheel 7 when having several type-rows is vertically adjustable for case-shifting, and the arm 27, which does not shift vertically, is of such length or extended so far into wheel 7 as to keep in engagement with the wheel, even when at its highest level. The arm 27 is shown extended from a sleeve rotary about shaft 21 and having stop-arm 22 and driving-shoulders 28, engaged by levers 29. One shift-lever 48 is shown, although more can be applied. The lever 48 engages riser 49, having arm 50, carrying a bracket or angle-piece 53, in the upper branch of which is shown a center or cone piece 54, suitably secured by a screw 55 or other means. At the lower branch of bracket 53 is another center or cone 56. The wheel 7 has a hub 57, which is centered or provided with conical seats for the centers 54 and 56. The shaft 21 is shown with bearings in the frame-piece 51 and block 52, forming fixed parts of the machine. In Figs. 1 and 2 the center 56 is shown forming part of shaft 21, so that the shaft shifts with the center and type-wheel. In Fig. 3 the center 56 is shown separate from shaft 21, and the latter need not shift, while the wheel and its centers 54 and 56 shift, as before noted. In Fig. 4 the shaft 21 is shown with a stem or contracted part 58, between which and the shaft part proper or body 21 is formed the conical bearing 56'. The threaded stem 58 allows a nut or bearing 54' and a jam-nut 59 to be applied. The bearings 54' and 56' are both conical to fit the conically-recessed hub 57. In Fig. 5 the bearing 56' is shown with a ball-race or ball-bearings, and antifriction-balls could also be applied between the bearing 54' and the hub.

The conical or center bearings 54 and 56 or 54' and 56', in connection with the conically or correspondingly recessed hub 57, allow compensation for wear, since such bearings when brought together will take up such wear. A proper fit of the wheel in its bearings can thus be obtained and the wheel made to run true. Such conical bearings with conical hub also make the wheels or segments readily interchangeable. To fit, for example, a cylindrical hub or tube to a cylindrical shaft may be difficult, as also to make a number of such tubular hubs or sleeves and cylindrical shafts uniform, so as to be interchangeable, and if the tube or shaft is worn looseness or inaccuracy results and any dirt or foreign matter or oil gumming between the sleeve and shaft may obstruct easy working of the wheel. With center or cone bearings, such as 54 56 or 54' 56', interchangeability is attained, as also accurate mounting and easy rotation of the wheel, and wear can be compensated for.

In the construction shown in Figs. 4 and 5 the tubular hub 57 may sit loose about shaft 21 or stem 58, as the centers 54' and 56' insure accurate position for the wheel. The shaft 21 is shown with its supports or bearings 51 and 52 separate from the bearings 54 and 56 for the hub 57. The wheel 7 can thus be removed from its bearings without disturbing the shaft or the bearings 51 or 52 of the shaft.

What I claim as new, and desire to secure by Letters Patent, is—

The combination with a type wheel or segment having a hub, and a bracket having upper and lower center bearings which center said hub, the upper bearing being vertically adjustable, of a horizontal vertically-shiftable arm connected with and carrying said bracket, a riser connected at its upper end portion with said arm, and a shifting-lever operating on the lower end portion of the riser for raising the same, substantially as and for the purposes described.

In testimony whereof I have hereunto set my hand in the presence of two subscribing witnesses.

WILLIAM P. QUENTELL.

Witnesses:
GEO. S. ANDERSON,
B. F. NEWMAN.